(12) United States Patent
Nakatani

(10) Patent No.: US 6,322,440 B1
(45) Date of Patent: Nov. 27, 2001

(54) OUTSIDE AIR INTAKE STRUCTURE

(75) Inventor: Shinsuke Nakatani, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/523,206

(22) Filed: Mar. 10, 2000

(30) Foreign Application Priority Data

Mar. 16, 1999 (JP) .................................................. 11-070204

(51) Int. Cl.$^7$ ...................................................... B60H 1/28
(52) U.S. Cl. ........................ 454/147; 296/192; 454/146; 454/148
(58) Field of Search ..................... 454/146, 147, 454/148; 296/192

(56) References Cited

U.S. PATENT DOCUMENTS

| | | | |
|---|---|---|---|
| 4,721,032 | * 1/1988 | Sakamoto | 454/146 |
| 4,819,550 | * 4/1989 | Ioka | 454/147 |
| 5,139,458 | * 8/1992 | Koukal et al. | 454/147 |
| 5,679,074 | * 10/1997 | Siegel | 454/147 |

FOREIGN PATENT DOCUMENTS

| | | | |
|---|---|---|---|
| 6-278655 | 10/1994 | (JP) . | |
| 58-221709-A | * 12/1983 | (JP) | 454/146 |
| 1-195111-A | * 8/1989 | (JP) | 454/146 |

\* cited by examiner

*Primary Examiner*—Harold Joyce
(74) *Attorney, Agent, or Firm*—McDermott, Will & Emery

(57) ABSTRACT

An outside air intake structure of an automobile includes (a) a cowl panel having a cowl panel opening; (b) a dash panel having a dash panel opening; and (c) a duct disposed on the dash panel opening. Thus, the outside air is allowed to pass through the cowl panel opening, then the duct, and then the dash panel opening. The duct has a duct opening for taking the outside air into the duct. This duct extends in a forward direction of the automobile such that the duct opening is disposed in a more forward position than the cowl panel opening in a fore-and-aft direction of the automobile. The outside air intake structure further has a bulkhead extending in a substantially vertical direction in an area defined between the duct opening and the cowl panel opening in a transverse direction of the automobile. The cowl panel has a raised portion. The duct has a top wall extending upwardly from a peripheral portion of the dash panel opening. The top wall extends along and adjacently below the cowl panel and has a raised portion disposed adjacently below the raised portion of the cowl panel. The outside air intake structure is capable of surely separating outside air from water, thus leading only the outside air toward a blower motor.

21 Claims, 4 Drawing Sheets

OUTSIDE AIR INTAKE STRUCTURE

BACKGROUND OF THE INVENTION

The present invention relates to an outside air intake structure for leading an outside air toward a blower motor.

DESCRIPTION OF THE PRIOR ART

Japanese Patent Unexamined Publication No. 6-278655 describes an outside air intake structure.

SUMMARY OF THE INVENTION

It is an object of the present invention to provide an outside air intake structure which is capable of surely separating outside air from water, thus leading only the outside air toward a blower motor.

According to the present invention, there is provided an outside air intake structure of an automobile. This automobile has a hood and a windshield. The outside air intake structure includes (a) a cowl panel disposed between the hood and the windshield of the automobile, the cowl panel having a cowl panel opening for taking an outside air into the automobile; (b) a dash panel having a dash panel opening such that the outside air is allowed to pass through the cowl panel opening and then the dash panel opening; and (c) a duct disposed on the dash panel to surround the dash panel opening thereby such that the outside air is allowed to pass through the cowl panel opening, then the duct, and then the dash panel opening.

According to a first aspect of the present invention, the duct has a duct opening at an end thereof for taking the outside air into the duct. This duct extends in a forward direction of the automobile such that the duct opening is disposed in a more forward position than the cowl panel opening in a fore-and-aft direction of the automobile.

According to a second aspect of the present invention, the duct has a duct opening at an end thereof for taking the outside air into the duct. The outside air intake structure further has a bulkhead extending in a substantially vertical direction in an area defined between the duct opening and the cowl panel opening.

According to a third aspect of the present invention, the cowl panel further has a raised portion. The duct has a top wall extending upwardly from a peripheral portion of the dash panel opening. The top wall extends along and adjacently below the cowl panel and has a raised portion disposed adjacently below the raised portion of the cowl panel.

DETAILED DESCRIPTION OF THE PREFERRED EMBODIMENT

Figure 1:
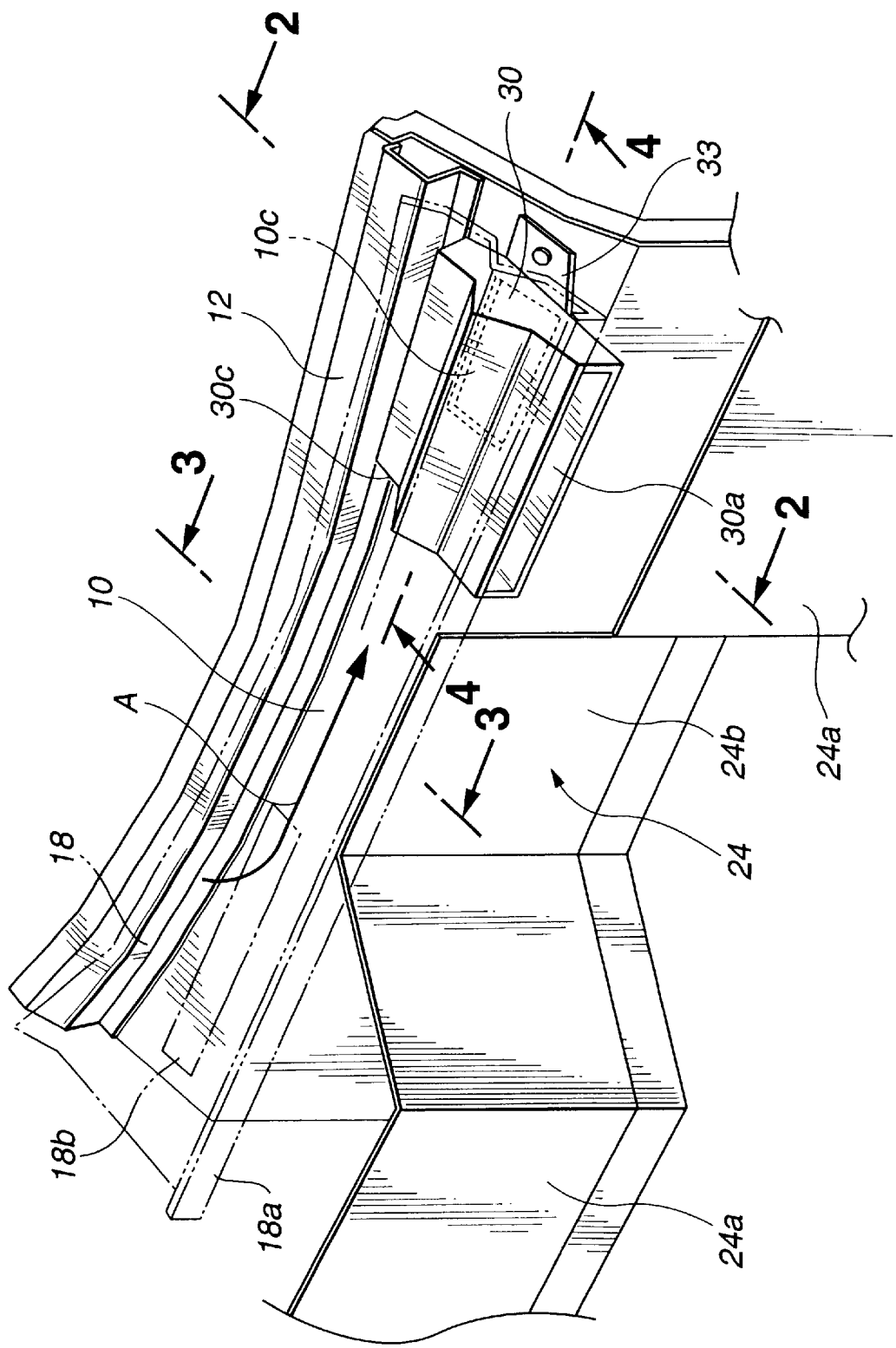
FIG. 1 is a perspective view of an outside air intake structure of an automobile, according to a preferred embodiment of the present invention.
Figure 2:
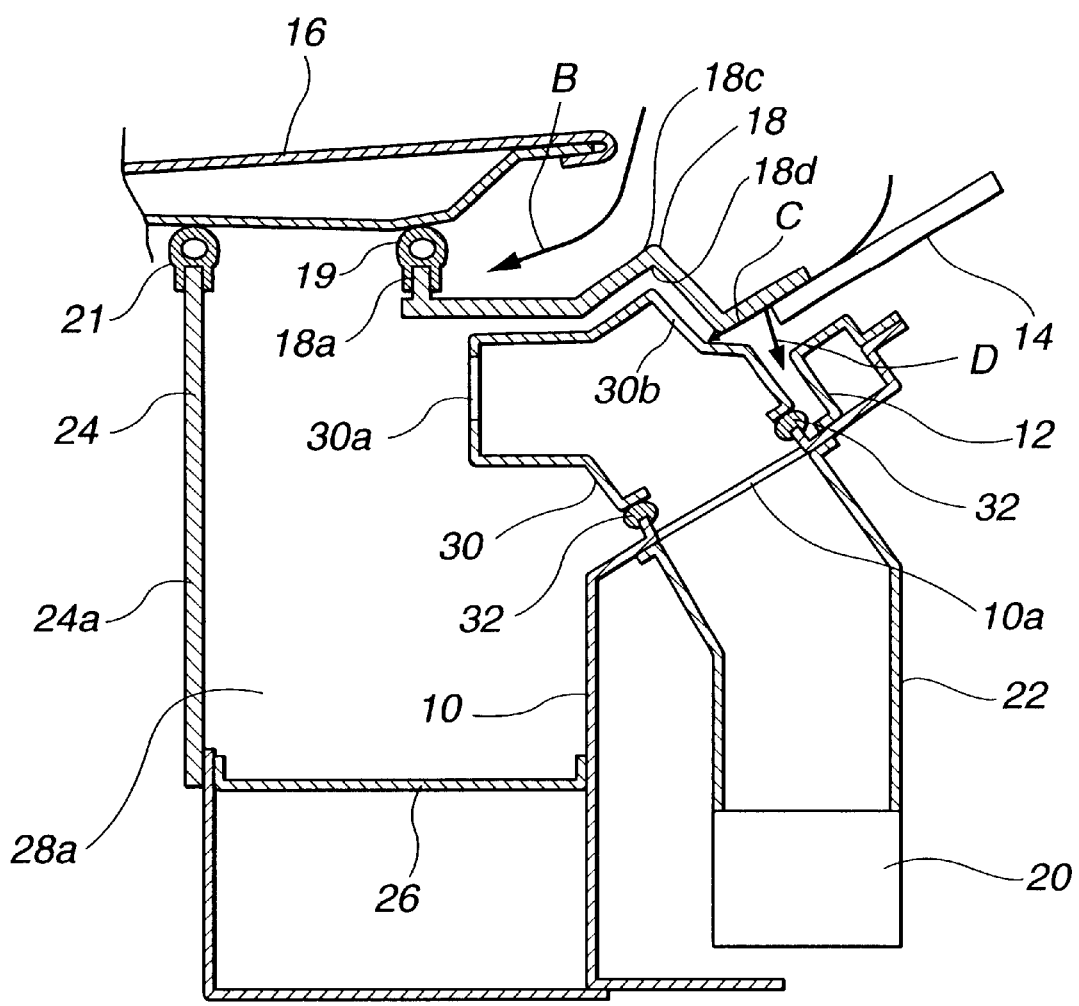
FIGS. 2, 3 and 4 are sectional views of the outside air intake structure, respectively taken along lines 2—2, lines 3—3 and lines 4—4 in FIG. 1.
Figure 3:
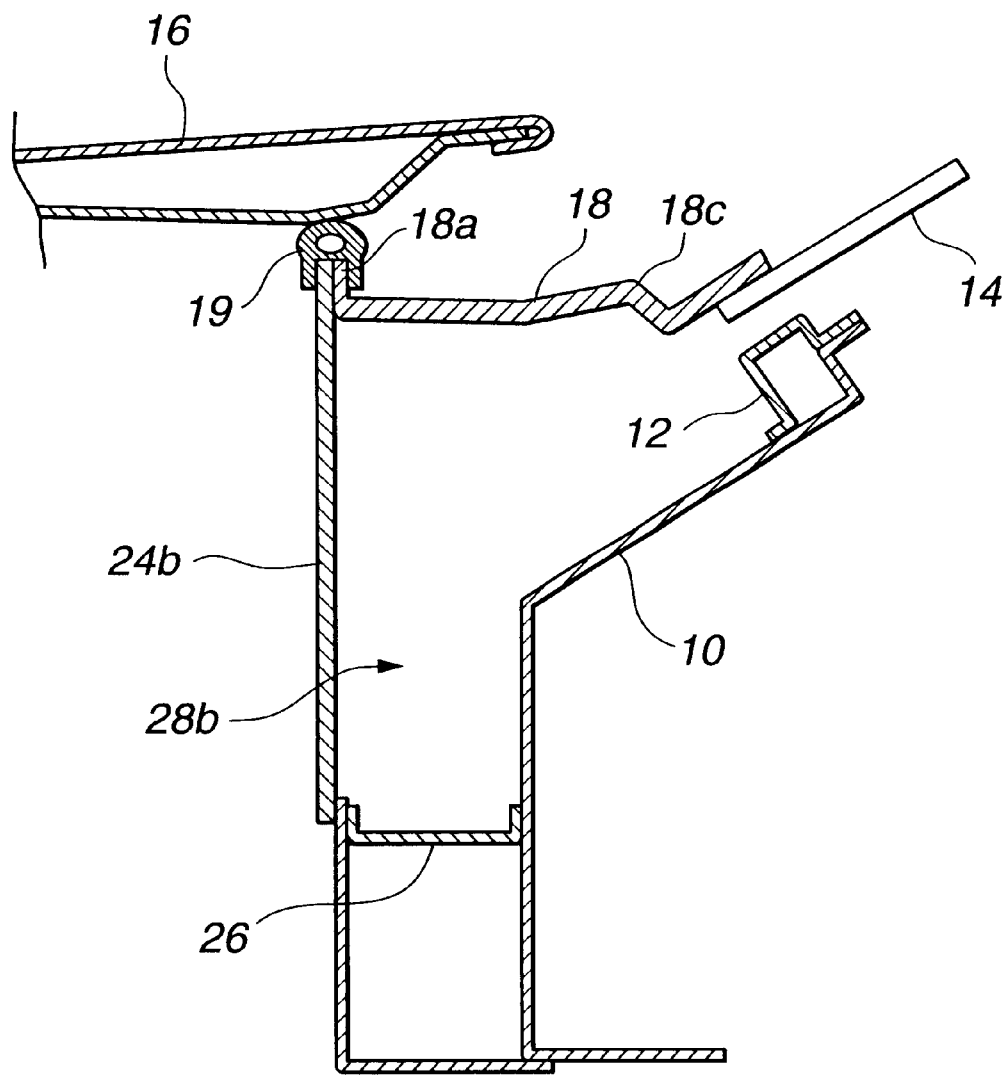

As is seen in FIG. 1 to FIG. 5, there is provided an outside air intake structure of an automobile, according to a preferred embodiment of the present invention. As shown in FIGS. 2–3, this outside air intake structure has a dash panel 10, which is made of steel. The dash panel 10 has at an upper end thereof a dash upper cross member 12 which is joined with the dash panel 10. The dash upper cross member 12 is also made of steel and has a cross section like rectangular "C." The dash upper cross member 12 extending in a transverse direction of the automobile forms a closed cross section concurrently with the dash panel 10. This closed cross section extends in a transverse direction of the automobile. Although not clearly shown in the drawings, a windshield 14 is supported at a lower end thereof on the dash upper cross member 12.

Figure 5:
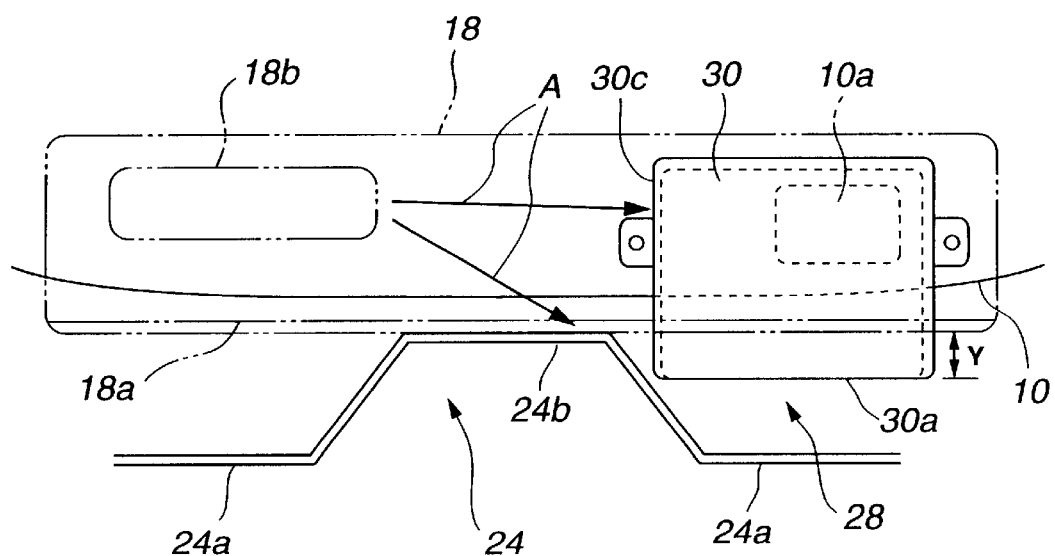
FIG. 5 is a top view of the outside air intake structure shown in FIG. 1.

As shown in FIGS. 2–3, the outside air intake structure further has a cowl panel 18 disposed between the windshield 14 and a hood 16. The cowl panel 18 is made of resin. A hook (not shown) is properly disposed at a lower end of the windshield 14. The cowl panel 18 is at a rear end thereof secured to the windshield 14 with the hook. An upward flange 18a is formed at a forward end of the cowl panel 18. As will be clarified hereinafter, the upward flange 18a is disposed in a more rearward position than a pair of front side walls 24a of a bulkhead 24 (see FIGS. 1, 2 and 5) and is in abutment against an upper end of a rear middle wall 24b of the bulkhead 24 (see FIGS. 1, 3 and 5). In other words, the upward flange 18a, extending in the transverse direction of the automobile, is at its middle portion in abutment with the upper end of the rear middle wall 24b of the bulkhead 24. As shown in FIGS. 2–3, the upward flange 18a has a first seal 19 thereon which is in a tight contact with a rear end of a bottom surface of the hood 16. In fact, the first seal 19 is formed at its middle portion on both of the upward flange 18a and the upper end of the rear middle wall 24b of the bulkhead 24 (see FIG. 3) and at its both side portions on only the upward flange 18a (see FIG. 2). Thus, another seal 21 is formed on the upper end of each front side wall 24a of the bulkhead 24. It is needless to say that this another seal 21 and the first seal 19 may be one-piece in construction. As shown in FIGS. 1 and 5, the cowl panel 18 has a cowl panel opening 18b for taking an outside air into the automobile from between the hood 16 and the windshield 14. The cowl panel opening 18b is formed on one side of the automobile in the transverse direction of the automobile. On the other side of the automobile, there is a dash panel opening 10a formed through the dash panel 10. In fact, the dash panel opening 10a is at a position lower than that of the cowl panel opening 18b. As is seen in FIG. 2, the dash panel opening 10a is connected to a blower unit 22 which is disposed on a rear side of the dash panel 10. The dash panel opening 10a communicates with a blower motor 20 of the blower unit 22.

As shown in FIGS. 1–3 and 5, the bulkhead 24 is oppositely disposed in a forward position of the dash panel 10. The bulkhead 24 is used for partitioning an engine room into a forward segment and a rear segment, thus protecting less heat-resistant parts from high temperature. In other words, less heat-resistant parts, such as battery and the like, may be disposed in the rear segment. This rear segment is a space 28 defined or enclosed by the bulkhead 24, the dash panel 10, the cowl panel 18 and a bottom wall 26 extending between the bulkhead 24 and the dash panel 10. This space 28 is a combination of a pair of spaces 28a and a space 28b interposed therebetween. A combination of the bulkhead 24 and the dash panel 10 forms a double wall construction, thus enhancing prevention of heat and noise in an engine room from entering vehicular occupant area. FIG. 2 shows that each front side wall 24a is far-off in space from the dash panel 10. Contrary to this, FIG. 3 shows that the rear middle wall 24b projecting rearwardly is closer in space to the dash panel 10. Around a lower portion of the bulkhead 24, a bottom wall 26 is joined to extend between the bulkhead 24 and the dash panel 10. Although not shown in the drawings, the bulkhead 24 may be formed of only the rear middle wall 24*b*.

Figure 4:
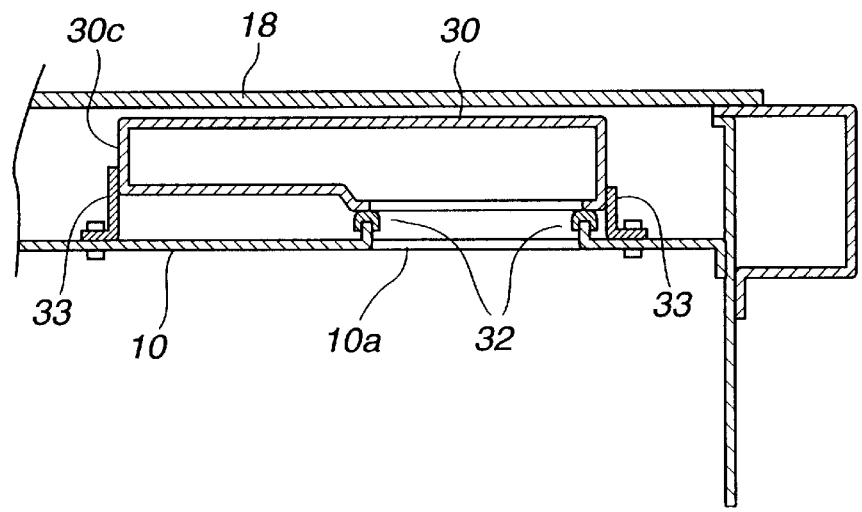

As shown in FIGS. 2 and 4, there is provided a duct 30 on the dash panel opening 10*a* in such a manner that a second seal 32 is put between the dash panel 10 and the duct 30, and the duct 30 encloses the dash panel opening 10*a*. In other words, the second seal 32 encircles the dash panel opening 10 such that there is provided a tight sealing between the duct 30 and the dash panel 10. The duct 30 is secured to the dash panel 10 and extends more forwardly than the dash panel 10. As shown in FIGS. 1 and 4, there are provided a pair of brackets 33 for securing the duct 30 to the dash panel. The duct 30 has a duct opening 30*a* at a forward end thereof. In the space 28, the duct opening 30*a* is opposed to one of the two front side walls 24*a* of the bulkhead 24 (see FIG. 5). In contrast, the other front side wall 24*a* is in the vicinity of the cowl panel opening 18*b*. In the transverse direction of the automobile, the rear middle wall 24*b* of the bulkhead 24 is disposed between the duct opening 30*a* and the cowl panel opening 18*b* (see FIGS. 1 and 5). As is seen in FIG. 5, the duct opening 30*a* is disposed in a more forward position than the cowl panel opening 18*b* in the fore-and-aft direction of the automobile. In addition, the duct opening 30*a* is disposed in a more forward position by a distance "Y" than the most rearward surface of the rear middle wall 24*b* of the bulkhead 24 in the fore-and-aft direction of the automobile. The outside air enters the automobile by driving the blower motor 20 by the following sequential steps: enter the cowl panel opening 18*b*, pass through the space 28, enter the duct opening 30*a*, pass through the duct 30, and flow into the dash panel opening 10*a* toward the blower motor 20. To minimize the air resistance during the introduction of the outside air, the duct opening 30*a* is designed equal to or larger in area than the dash panel opening 10*a*.

As is seen in FIGS. 1 and 2, the duct 30 has a top wall 30*b* extending upwardly from a peripheral portion of the dash panel opening 10*a*. This top wall 30*b* is configured and arranged to extend along and adjacently below a bottom face 18*d* of the cowl panel 18, as illustrated. The cowl panel 18 has a triangular raised portion 18*c* extending in the transverse direction of the automobile. The top wall 30*b* of the duct also has a triangular raised portion that is configured and arranged adjacently below the raised portion 18*c* of the cowl panel 18.

After a wiper unit (not shown) is secured to the dash panel 10, the cowl panel 18 is mounted to cover the space 28. Upon this, the positioning of the cowl panel 18 can be conducted easily by fitting the raised portion 18*c* of the cowl panel 18 to the raised portion of the duct 30. Moreover, the cowl panel 18 can be supported on the duct 30 when the cowl panel 18 is pressed down, since the duct is configured and arranged to extend adjacently below the cowl panel 18. This helps improve stiffness of the cowl panel 18.

Stated hereinafter is how the aforementioned outside air intake structure operates.

As mentioned above, the outside air taken in through the cowl panel opening 18*b* takes the following sequential steps: passing the space 28, introduced into the dash panel opening 10*a* via the duct opening 30*a*, sent to the blower motor 20, and entering the vehicular occupant area. With the outside air, water (e.g. rain drops) may be taken in through the cowl panel opening 18*b*. Most part of the water may, due to its weight, drop onto the dash panel 10 or the bottom wall 26, and then may be drained therefrom. As is indicated with an arrow "A" in FIG. 1 and FIG. 5, some part of water may reach the duct 30 concurrently with the air. The duct 30 has a side wall 30*c* extending in the forward direction of the automobile. In fact, according to the invention, the duct opening 30*a* is disposed in a more forward position than the cowl panel opening 18*b* in the fore-and-aft direction of the automobile, as shown in FIGS. 1 and 5. This unique feature of the invention is provided in order to prevent the introduction of water into the duct 30 as much as possible. Thus, the water may hit the side wall 30*c* of the duct 30, thus dropping onto the dash panel 10 or the bottom wall 26. Furthermore, as mentioned above, the bulkhead 24 is configured to have the rear middle wall 24*b* having the rearmost surface positioned in a more rearward position by a distance "Y" than the duct opening 30*a*. This another unique feature of the invention is provided to block the introduction of the water into the duct (see FIG. 5). Thus, the water may also hit the rear middle wall 24*b* which is disposed between the cowl panel opening 18*b* and the duct opening 30*a* in the transverse direction of the automobile, thus dropping onto the dash panel 10 or the bottom wall 26. If still other part of the water should enter and remain un-dropped by evading the side wall 30*c* and the rear middle wall 24*b*, such water can be led from the space 28*b* to the space 28*a* which expands in a great volume between the dash panel 10 and the front side wall 24*a* of the bulkhead 24. Thus, the space 28*a* acts as a air-water separator for separating air from water. Since the duct opening 30*a* is opposed to the bulkhead 24, it becomes possible to further prevent the introduction of water into the duct opening 30*a*.

As is indicated with an arrow "B" in FIG. 2, the water entering an area between the hood 16 and the cowl panel 18 can be prevented by the first seal 19 from further entering the space 28, which first seal 19 is secured to the upward flange 18*a* of the cowl panel 18. Moreover, as is indicated with an arrow "C" in FIG. 2, the water entering from between the cowl panel 18 and the windshield 14 and flowing into between the bottom face 18*d* of the cowl panel 18 and the top wall 30*b* of the duct 30 can be prevented by the triangular raised portion of the duct 30 from flowing toward the duct opening 30*a* over the top wall 30*b* of the duct 30. Thereafter, the water can be flown along the raised portion of the duct 30 in the transverse direction of the automobile, thus being drained from either side of the automobile. It is possible to form the raised portion of the duct to have a height to assuredly prevent the water flow thereover toward the duct opening 30*a*. Furthermore, as indicated with an arrow "D" in FIG. 2, the water flowing downward onto the dash panel 10 around the duct 30 can be prevented by the second seal 32 from entering the dash panel opening 10*a*.

Extending the duct 30 forwardly will allow the duct opening 30*a* to be disposed in a more forward position than the cowl panel opening 18*b* and/or the most rearward surface of the rear middle wall 24*b* of the bulkhead 24, regardless of where the dash panel opening 10*a* is positioned on the dash panel 10. The dash panel opening 10 therefore can be disposed toward a middle area in the transverse direction of the automobile, in a manner to reduce the distance between the dash panel opening 10*a* and the cowl panel opening 18*b*. This will contribute to developing a smaller air conditioner. In addition, this will improve the liberty to design the car body shape.

In the aforementioned embodiment, the cowl panel 18 is the one separated from the duct 30. However, it is also possible to form the cowl panel and the duct into a one-piece construction. With this, it becomes possible to further prevent the introduction of water into the duct opening 30*a*, since there is no gap between the bottom face 18d of the cowl panel and the top wall 30b of the duct 30.

The entire contents of Japanese Patent Application 11-070204 (filed Mar. 16, 1999) is incorporated herein by reference.

Although the invention has been described above by reference to a certain embodiment of the invention, the invention is not limited to the embodiment described above. Modifications and variations of the embodiment described above will occur to those skilled in the art, in light of the above teachings.

The scope of the invention is defined with reference to the following claims.

What is claimed is:

1. An outside air intake structure of an automobile, the automobile comprising a hood and a windshield, the outside air intake structure comprising:
   a) a cowl panel disposed between the hood and the windshield of the automobile, the cowl panel having a cowl panel opening for taking an outside air into the automobile;
   b) a dash panel comprising a dash panel opening such that the outside air is allowed to pass through the cowl panel opening and then the dash panel opening; and
   c) a duct disposed on the dash panel to surround the dash panel opening thereby such that the outside air is allowed to pass through the cowl panel opening, then the duct, and then the dash panel opening, the duct comprising a duct opening at an end thereof for taking the outside air into the duct, the duct extending in a forward direction of the automobile such that the duct opening is disposed in a more forward position than the cowl panel opening in a fore-and-aft direction of the automobile.

2. An outside air intake structure as recited in claim 1, further comprising a blower motor for introducing the outside air into an interior space of the automobile, the blower motor communicating with the dash panel opening.

3. An outside air intake structure as recited in claim 1, further comprising a bulkhead disposed in a more forward position than the dash panel in the fore-and-aft direction of the automobile, the bulkhead having a first portion that is disposed in a more forward position of the automobile than the duct opening and is opposed to the duct opening.

4. An outside air intake structure as recited in claim 3, in which the duct opening is in a space defined by the cowl panel, the dash panel, the bulkhead, and a bottom wall extending between the dash panel and the bulkhead.

5. An outside air intake structure as recited in claim 3, in which the bulkhead is partly shifted rearward to have a most rearward wall surface in an area that is defined in a transverse direction of the automobile between the cowl panel opening and the duct opening, and the duct opening is disposed in a more forward position of the automobile than the most rearward wall surface of the bulkhead.

6. An outside air intake structure as recited in claim 1, in which the cowl panel has a raised portion, and the duct has a top wall extending upwardly from a peripheral portion of the dash panel opening, the top wall extending along and adjacently below the cowl panel and having a raised portion disposed adjacently below the raised portion of the cowl panel.

7. An outside air intake structure of an automobile, the automobile comprising a hood and a windshield, the outside air intake structure comprising:
   a) a cowl panel disposed between the hood and the windshield of the automobile, the cowl panel having a cowl panel opening for taking an outside air into the automobile;
   b) a dash panel comprising a dash panel opening;
   c) a duct comprising a first end connected to a peripheral portion of the dash panel opening and a second end formed with a duct opening; and
   d) a bulkhead comprising an extended portion which protrudes into a space defined between the duct opening and the cowl panel opening.

8. An outside air intake structure as recited in claim 7, in which the bulkhead further has a pair of side walls in a transverse direction of the automobile, one of the side walls being opposed to the duct opening.

9. An outside air intake structure of an automobile, the automobile comprising a hood and a windshield, the outside air intake structure comprising:
   a) a cowl panel disposed between the hood and the windshield of the automobile, the cowl panel having a cowl panel opening for taking an outside air into the automobile;
   b) a dash panel comprising a dash panel opening;
   c) a duct comprising a first end connected to a peripheral portion of the dash panel opening and a second end formed with a duct opening;
   d) a bulkhead comprising an extended portion which protrudes into a space defined between the duct opening and the cowl panel opening;
      in which the duct opening is disposed in a more forward position than the cowl panel opening in a fore-and-aft direction of the automobile.

10. An outside air intake structure of an automobile, the automobile comprising a hood and a windshield, the outside air intake structure comprising:
    a) a cowl panel disposed between the hood and the windshield of the automobile, the cowl panel having a cowl panel opening for taking an outside air into the automobile;
    b) a dash panel comprising a dash panel opening;
    c) a duct comprising a first end connected to a peripheral portion of the dash panel opening and a second end formed with a duct opening;
    d) a bulkhead comprising an extended portion which protrudes into a space defined between the duct opening and the cowl panel opening;
       in which the duct opening is disposed in a more forward position than the cowl panel opening in a fore-and-aft direction of the automobile;
       in which the duct opening is disposed in a more forward position of the automobile than the bulkhead.

11. An outside air intake structure of an automobile, the automobile comprising a hood and a windshield, the outside air intake structure comprising:
    a) a cowl panel disposed between the hood and the windshield of the automobile, the cowl panel having a cowl panel opening for taking an outside air into the automobile;
    b) a dash panel comprising a dash panel opening;
    c) a duct comprising a first end connected to a peripheral portion of the dash panel opening and a second end formed with a duct opening;
    d) a bulkhead comprising an extended portion which protrudes into a space defined between the duct opening and the cowl panel opening;
       in which the duct opening is disposed in a space defined by the cowl panel, the dash panel, the bulkhead, and the bottom wall extending between the dash panel and the bulkhead.

12. An outside air intake structure of an automobile, the automobile comprising a hood and a windshield, the outside air intake structure comprising:
   a) a cowl panel disposed between the hood and the windshield of the automobile, the cowl panel having a cowl panel opening for taking an outside air into the automobile;
   b) a dash panel comprising a dash panel opening;
   c) a duct comprising a first end connected to a peripheral portion of the dash panel opening and a second end formed with a duct opening;
   d) a bulkhead comprising an extended portion which protrudes into a space defined between the duct opening and the cowl panel opening;
      in which the cowl panel has a raised portion, and the duct has a top wall extending upwardly from a peripheral portion of the dash panel opening, the top wall extending along and adjacently below the cowl panel and having a raised portion disposed adjacently below the raised portion of the cowl panel.

13. An outside air intake structure of an automobile, the automobile comprising a hood and a windshield, the outside air intake structure comprising:
   a) a cowl panel disposed between the hood and the windshield of the automobile, the cowl panel having (1) a cowl panel opening for taking an outside air into the automobile and (2) a raised portion;
   b) a dash panel comprising a dash panel opening such that the outside air is allowed to pass through the cowl panel opening and then the dash panel opening; and
   c) a duct disposed on the dash panel to surround the dash panel opening thereby such that the outside air is allowed to pass through the cowl panel opening, then the duct, and then the dash panel opening, the duct having a top wall extending upwardly from a peripheral portion of the dash panel opening, the top wall extending along and adjacently below the cowl panel and having a raised portion disposed adjacently below the raised portion of the cowl panel.

14. An outside air intake structure of an automobile, the automobile comprising a hood and a windshield, the outside air intake structure comprising:
   a) a cowl panel disposed between the hood and the windshield of the automobile, the cowl panel having a cowl panel opening for taking an outside air into the automobile;
   b) a dash panel comprising a dash panel opening; and
   c) a duct comprising a first end connected to a peripheral portion of the dash panel opening and a second end formed with a duct opening, the duct extending in a forward direction of the automobile such that the duct opening is disposed in a more forward position than the cowl panel opening in a fore-and-aft direction of the automobile.

15. An outside air intake structure as recited in claim 14, further comprising a blower motor for introducing the outside air into an interior space of the automobile, the blower motor communicating with the dash panel opening.

16. An outside air intake structure as recited in claim 14, further comprising a bulkhead disposed in a more forward position than the dash panel in the fore-and-aft direction of the automobile, the bulkhead having a first portion that is disposed in a more forward position of the automobile than the duct opening and is opposed to the duct opening.

17. An outside air intake structure as recited in claim 16, in which the duct opening is in a space defined by the cowl panel, the dash panel, the bulkhead, and a bottom wall extending between the dash panel and the bulkhead.

18. An outside air intake structure as recited in claim 16, in which the bulkhead is partly shifted rearward to have a most rearward wall surface in an area that is defined in a transverse direction of the automobile between the cowl panel opening and the duct opening, and the duct opening is disposed in a more forward position of the automobile than the most rearward wall surface of the bulkhead.

19. An outside air intake structure as recited in claim 14, in which the cowl panel has a raised portion, and the duct has a top wall extending upwardly from a peripheral portion of the dash panel opening, the top wall extending along and adjacently below the cowl panel and having a raised portion disposed adjacently below the raised portion of the cowl panel.

20. An outside air intake structure as recited in claim 14, wherein at least one of a bulkhead and side walls of said duct are disposed to substantially occlude a direct linear fluid pathway between said cowl panel opening and said dash panel opening.

21. An outside air intake structure of an automobile, the automobile comprising a hood and a windshield, the outside air intake structure comprising:
   a) a cowl panel disposed between the hood and the windshield of the automobile, the cowl panel having (1) a cowl panel opening for taking an outside air into the automobile and (2) a raised portion;
   b) a dash panel comprising a dash panel opening; and
   c) a duct comprising a first end connected to a peripheral portion of the dash panel opening and a second end formed with a duct opening, the duct having a top wall extending upwardly from the peripheral portion of the dash panel opening, the top wall extending along and adjacently below the cowl panel and having a raised portion disposed adjacently below the raised portion of the cowl panel.

* * * * *